United States Patent [19]

Röhm

[11] Patent Number: 4,995,303
[45] Date of Patent: Feb. 26, 1991

[54] SENSOR-EQUIPPED ACTUATOR FOR POWER CHUCK

[76] Inventor: Günter H. Röhm, Heinrich-Röhm-Strasse 50, D-17927 Sontheim, Fed. Rep. of Germany

[21] Appl. No.: 461,987

[22] Filed: Jan. 8, 1990

[30] Foreign Application Priority Data

Sep. 1, 1989 [DE] Fed. Rep. of Germany ....... 3929011
Oct. 18, 1989 [EP] European Pat. Off. ........ 89119302.1

[51] Int. Cl.$^5$ ............................................ F01B 25/26
[52] U.S. Cl. ...................................... 92/5 R; 92/106; 91/1; 279/4
[58] Field of Search ................. 92/5 R, 110, 111, 112, 92/106; 91/1, DIG. 4; 279/4

[56] References Cited

U.S. PATENT DOCUMENTS

| | | | |
|---|---|---|---|
| 3,641,875 | 2/1972 | Kodalle | 91/1 |
| 4,040,338 | 8/1977 | Wilson et al. | 279/4 |
| 4,141,263 | 2/1979 | Leutgäs | 279/4 |
| 4,221,160 | 9/1980 | Selden | 279/4 |
| 4,249,451 | 2/1981 | LeMonl | 91/1 |
| 4,332,186 | 6/1982 | Röhm | 91/1 |
| 4,493,041 | 1/1985 | Antoni | 279/4 |
| 4,493,242 | 1/1985 | Röhm | 279/4 |
| 4,762,050 | 8/1988 | Marchand | 91/1 |

Primary Examiner—John T. Kwon
Assistant Examiner—Thomas Denion
Attorney, Agent, or Firm—Herbert Dubno; Andrew M. Wilford

[57] ABSTRACT

A power actuator has a hollow cylinder housing generally centered on an axis, a piston axially displaceable but non-rotatable in the housing and defining therein a pair of axially opposite pressurizable compartments, and a piston stem centered on the axis, fixed to the piston, extending axially from the piston, and formed with a pair of separate feed passages each having one end opening into a respective compartment and an opposite end opening axially on the stem. A distributor body rotatable about the axis on the stem at the opposite ends of the passages but axially nondisplaceable on the stem is provided with respective connections communicating with the opposite ends. Thus the compartments can be pressurized via the respective passages and connections for axial movement of the piston and stem in the housing. A pair of axially spaced guides are fixed on the distributor body and a bearing has a race axially rotatable on the housing about the axis but axially nondisplaceable on the housing. An axially extending rod axially displaceable in the guides on the distributor body has a front end that is connected to the race such that it can move limitedly radially relative thereto but not axially. An actuating element is coupled to the rod and a sensor is fixed on the distributor body and actuatable by the element of the rod.

13 Claims, 4 Drawing Sheets

SENSOR-EQUIPPED ACTUATOR FOR POWER CHUCK

FIELD OF THE INVENTION

The present invention relates to an actuator for a power chuck. More particularly this invention concerns a hydraulic actuator provided with sensors for detecting the position of the chuck parts controlled by the actuator.

BACKGROUND OF THE INVENTION

A standard power actuator for a chuck, mandrel, or like machine tool adapted to hold a tool or a workpiece that is being machined typically has a hollow cylinder housing generally centered on an axis and normally fixed to, for instance, the chuck body, and a piston axially displaceable but nonrotatable in the housing, defining therein a pair of axially opposite pressurizable compartments, and normally fixed, for instance, to the jaw-actuating member of the chuck. A piston stem centered on the axis, fixed to the piston, and extending axially from the piston is formed with a pair of separate feed passages each having one end opening into a respective compartment and an opposite end opening axially on the stem. A distributor body rotatable about the axis on the stem at the opposite ends of the passages is provided with respective connections communicating with the opposite ends, so that the compartments can be pressurized via the respective passages and connections for axial movement of the piston and stem in the housing, thereby moving the jaws on the chuck body. Structure on the stem and body permits the body to rotate about the axis thereon but prevents the body from moving axially on the stem.

In order to use such an actuator in an automated machining system it is necessary to provide a position-monitoring unit that itself is connected to a controller that in turn operates the valves that themselves control the actuator. This is typically done by providing on the cylinder housing a bearing that is connected to an outrigger that carries a switch- or sensor-actuating member that can coact with a switch or sensor carried on the distributor body that itself is fixed axially but not rotationally on the piston stem. Thus this actuating member is axially but not rotationally fixed on the cylinder housing so that as the cylinder housing and piston move axially relative to each other the actuating member will move past the switch/sensor. The relative positions of the switch/sensor and the actuating member can be set such that, for instance, the switch/sensor is actuated when the chuck is fully opened or closed.

In German patent document No. 3,117,850 the outrigger is a flat slide which runs in guide grooves formed in the distributor body. The flat slide has its front end fixed on a split ring which is mounted via a bearing on the cylinder housing. The split ring has a pair of shoulders which axially oppositely engage this bearing, clamping this ring in place on the outer race of the bearing.

Such an arrangement is expensive with regard to the formation of the rod and of the guide for the outrigger, and requires that the outrigger ring fit perfectly on the bearing. Furthermore the radial spacing of the guides for the outrigger must be very accurately machined, thereby making manufacture of the system quite costly.

This German patent document also discloses an arrangement wherein the cylinder housing is provided with an element forming a radially outwardly open guide groove in which a roller on the outrigger engages. In such an arrangement there are considerable frictional losses. In addition there is inherently some axial play between the roller and the guide groove because without such play the roller would certainly jam. This play clearly results in somewhat inaccurate response from the sensor/switches.

OBJECTS OF THE INVENTION

It is therefore an object of the present invention to provide an improved position-monitoring system for a power actuator.

Another object is the provision of such an improved position-monitoring system for a power actuator which overcomes the above-given disadvantages, that is which is of simple and inexpensive construction yet which gives extremely accurate position readings.

SUMMARY OF THE INVENTION

A power actuator has a hollow cylinder housing generally centered on an axis, a piston axially displaceable but nonrotatable in the housing and defining therein a pair of axially opposite pressurizable compartments, and a piston stem centered on the axis, fixed to the piston, extending axially from the piston, and formed with a pair of separate feed passages each having one end opening into a respective compartment and an opposite end opening axially on the stem. A distributor body rotatable about the axis on the stem at the opposite ends of the passages but axially nondisplaceable on the stem is provided with respective connections communicating with the opposite ends. Thus the compartments can be pressurized via the respective passages and connections for axial movement of the piston and stem in the housing. According to the invention a pair of axially spaced guides are fixed on the distributor body and a bearing has a race axially rotatable on the housing about the axis but axially nondisplaceable on the housing. An axially extending rod axially displaceable in the guides on the distributor body has a front end juxtaposed with the race and connected with the race by an arrangement that permits limited relative radial movement between the rod front end and the race and that prohibits relative axial movement between the rod front end and the race. An actuating element is coupled to the rod and a sensor is fixed on the distributor body and actuatable by the element of the rod.

With this arrangement the guides for the position-monitoring system is not only simpler and cheaper to build, but the connection to the outrigger is much simplified also. The relative radial movement between the rod and the bearing makes compensation for any misalignments between the guides and this bearing. The assembly need not be built to very high tolerances, yet still will operate without any play whatsoever in the critical axial direction.

According to a feature of this invention the actuating element is fixed directly on the rod. In addition the distributor body has a pair of axially spaced flanges forming the guides and formed with axially aligned holes in which the rod is axially slidable. The structure interconnecting the rod front end and the bearing race includes a ring fixed on the rod and engageable axially in one direction with the race, another ring axially movable on the rod and engageable axially in the opposite direction with the race, and a spring braced axially between the movable ring and the rod and urging the movable ring axially in the opposite direction into contact with the race. The rod is formed adjacent the fixed ring with an abutment surface facing in the one direction and axially engageable with the movable ring. Furthermore an abutment is fixed axially on the rod and the spring is a spring washer braced axially between the abutment and the movable ring. This abutment can be a snap ring. So long as the spring force is greater than the frictional resistance of the rod in the guides, there is no axial play whatsoever between the rod and the cylinder housing. At the same time this spring gripping of the outer bearing race allows the requisite radial movement between the rod and the bearing.

In accordance with a further feature of this invention relative angular movement between the rod front end and the race is inhibited by radially interengaging formations on the rod front end and the race. These formations can include a pin projecting from the rod into a seat or recess of the bearing.

The actuating element of this invention is a ring axially displaceable along the rod and a set screw or the like serves to fix the ring on the rod at any of a multiplicity of axially offset positions therealong. A holder carried on the distributor body carries the sensor. Furthermore the holder is formed with a plurality of axially elongated slots each receiving a respective such sensor and each sensor is provided with means for securing it in position at any of a multiplicity of locations along the respective slot.

In accordance with another system according to the invention the actuator comprises a plurality of such rods distributed angularly around the distributor body and each carrying a respective such actuating element each in turn coacting with at least one such sensor. An end plate formed at the axis with a central hole lies axially rearward of the distributor body. Each rod has a rear end fixed in the end plate.

DESCRIPTION OF THE DRAWINGS

The above and other objects, features, and advantages will become more readily apparent from the following, reference being made to the accompanying drawing in which.

SPECIFIC DESCRIPTION

Figure 1:
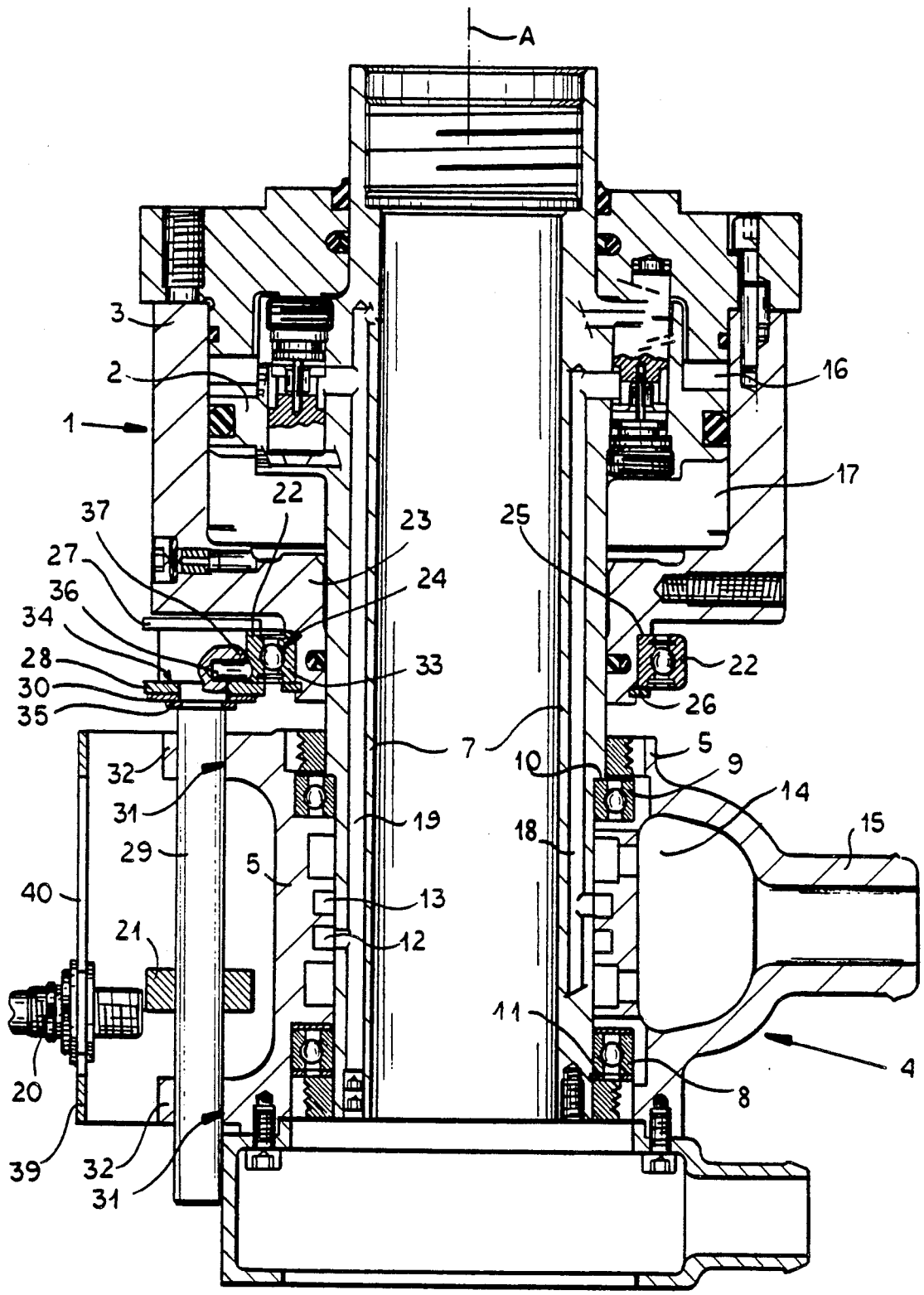
FIG. 1 is an axial section through an embodiment of the instant invention.
Figure 2:
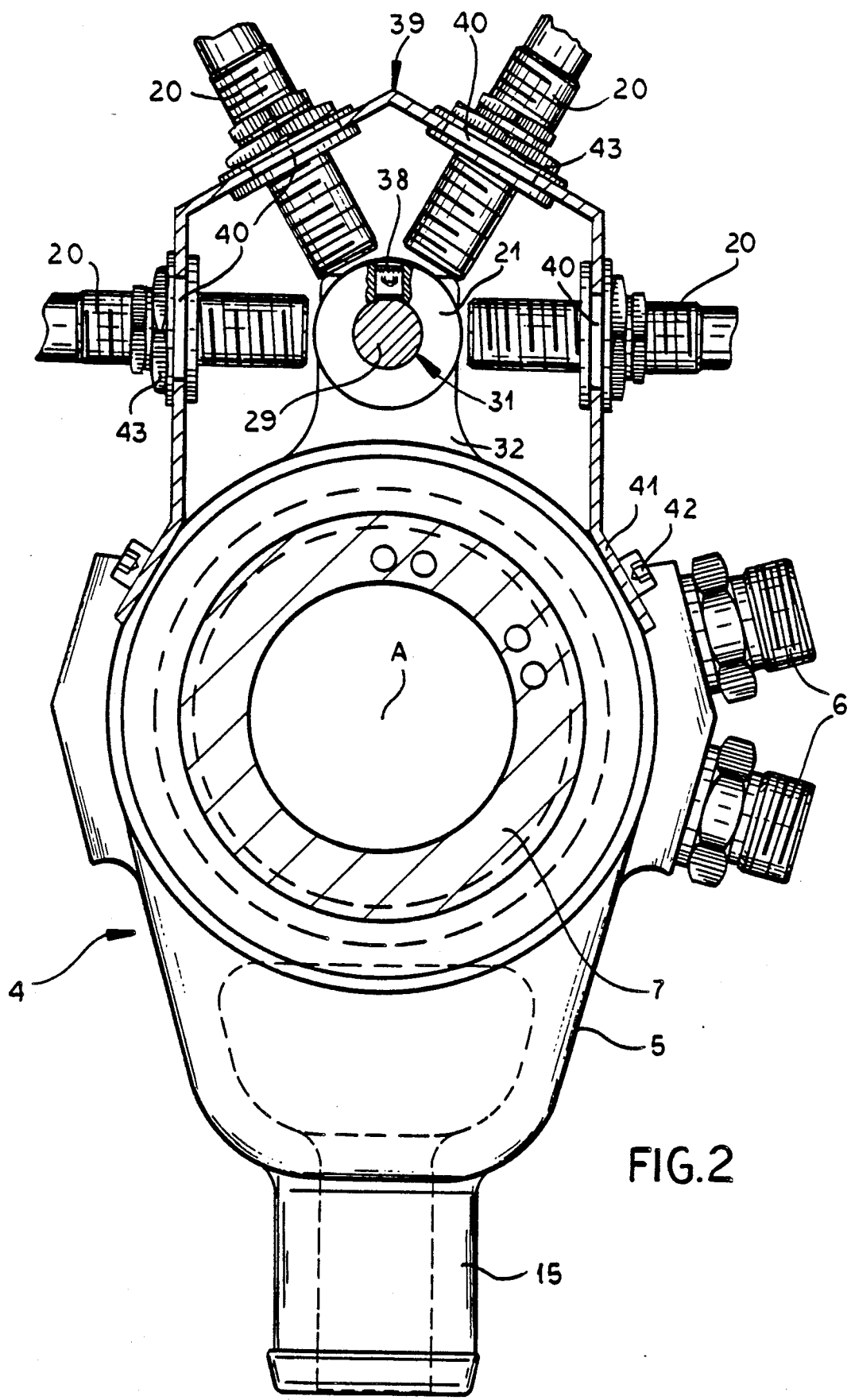
FIG. 2 is a cross section through the embodiment of FIG. 1.

As seen in FIGS. 1 and 2 a power actuator has a cylinder housing 3 adapted to be mounted on one element, typically the body, of a chuck or mandrel and is centered on an axis A that is normally the rotation axis of this element. A piston 2 subdivides the hollow interior of this cylinder housing 3 into a pair of compartments 17 and 16 and itself is normally connected to the other part of the power chuck or mandrel. A distributor 4 has a body 5 provided with connections 6 for high and low pres sure and is carried on a stem 7 integral with and extending axially from the piston 2. Bearings 8 and 9 respectively braced against a shoulder 10 and snap ring 11 of the stem 7 secure the distributor body 5 against axial displacement relative to the piston 3 and its stem 7 while permitting this body 5 to rotate freely about the axis A on the stem 7. Radially inwardly open grooves 12 and 13 formed in the body 5 communicate with the ends of respective passages 18 and 19 that open into the compartments 16 and 17. Thus these compartments 16 and 17 can be pressurized via the respective passages 18 and 19 from the respective connections 6 to move the piston 2 in one or the other axial direction for tightening or loosening the chuck or mandrel carried by the actuator 1. Any hydraulic fluid that leaks at the interface between the body 5 is caught in a chamber 14 and drained off via a drain nipple 15 that normally opens downward, the axis A normally being horizontal.

The housing 3 has at its front end turned toward the distributor 4 an integral collar 23 in which a bearing 24 centered on the axis A is seated. An inner race 33 of this bearing 24 is fixed axially between a shoulder 25 and a snap ring 26 on the housing collar 23. The bearing 24 also has an outer race 22 which therefore is axially fixed on the normally rotating cylinder housing 3 but which can, of course, rotate freely thereon about the axis A.

A circular-section rod 29 rides in axially aligned cylindrical guide holes 31 formed in axially spaced lug guide extensions 32 of the distributor body 5. An abutment ring 27 formed on the front end of the rod 29 axially rearwardly engages the outer bearing race 22 and an axially movable abutment ring 28 is urged axially forward against an abutment surface 34 of the rod 29 by a spring washer 30 itself braced against a snap ring 35 set into the 29. The outer race 22 is embraced axially between the rings 27 and 28 and is formed with a radially outwardly open groove or seat 37 in which fits a radial pin 36 fixed in the rod 29. Thus this rod 29 is axially fixed via the bearing 24 on the housing 3, can move limitedly radially relative thereto, and is rotationally fixed on the distributor body 5.

The rod 29 carries between the lugs 32 a sensor- or switch-actuating body 21 constituted as a metal ring 21 held in place by a set screw 38. The distributor housing 5 has flanking the lugs 32 a pair of flat facets 41 to which screws 42 secure a holder yoke 39 formed with a plurality of flat metal sections each formed in turn with an axially elongated slot 40 in which a respective sensor or switch 20 is secured by a nut 43. These sensors 20 respond to contact with or proximity of the actuating body 21 and can be set to respond, therefore, when the elements connected to the piston 2 and housing 3 are in certain predetermined positions. These sensor/switches 20 are in turn connected to a control circuit that includes a reversing valve that pressurizes the compartments 16 and 17 via the connections 6.

Figure 3:
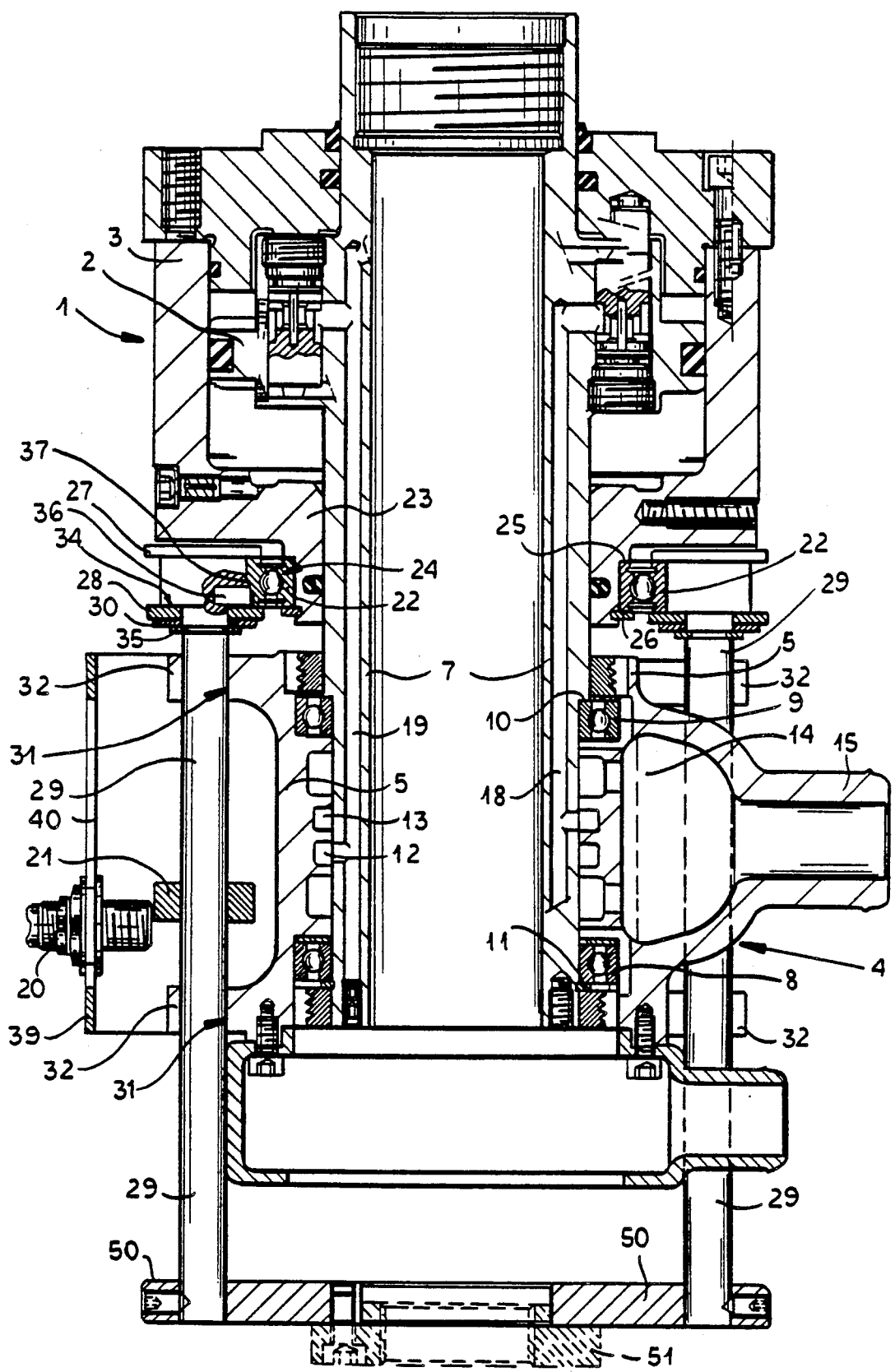
FIGS. 3 and 4 are views like FIGS. 1 and 2, respectively, showing another embodiment of this invention.
Figure 4:
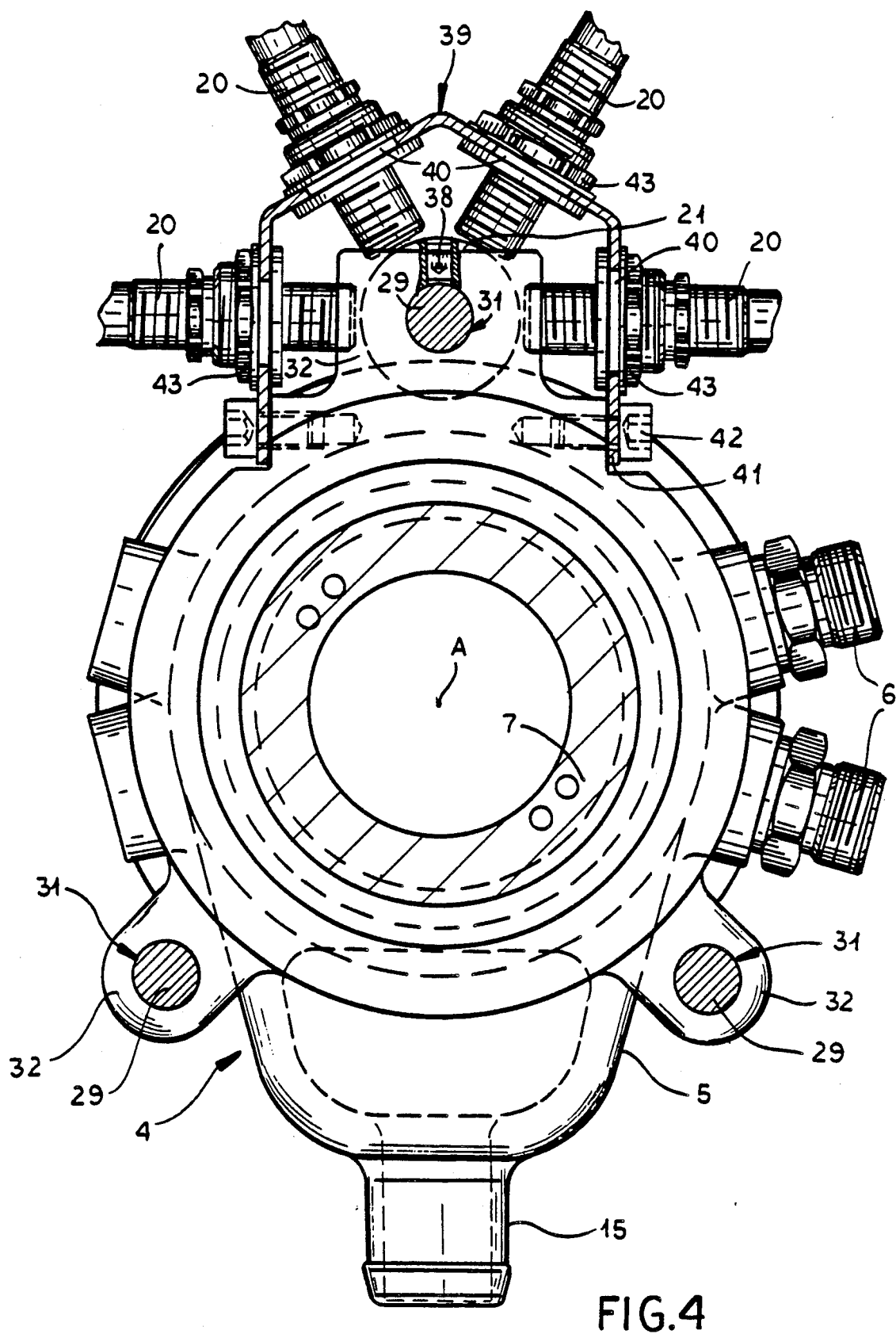

In FIG. 3 and 4, where identical reference numerals are as in FIGS. 1 and 2 are used for functionally and/or structurally identical elements, there are three angularly equispaced position rods 29 each associated with a respective holder yoke 39 carrying a respective set of sensor/switches 21. The rear ends of these rods 29 are all fixed in a common end plate 50 itself carrying a feed plate 51 with a central aperture so that workpieces can pass through it. In this arrangement only one of the rods 29 need have the spring-loaded gripping arrangement 27, 28, 30 for the outer race 22 of the bearing 24.

I claim:

1. A power actuator comprising:
  a hollow cylinder housing generally centered on an axis;
  a piston axially displaceable but nonrotatable in the housing and defining therein a pair of axially opposite pressurizable compartments;

a piston stem centered on the axis, fixed to the piston, extending axially from the piston, and formed with a pair of separate feed passages each having one end opening into a respective compartment and an opposite end opening axially on the stem;

a distributor body rotatable about the axis on the stem at the opposite ends of the passages but axially nondisplaceable on the stem, the body being provided with respective connections communicating with the opposite ends, whereby the compartments can be pressurized via the respective passages and connections for axial movement of the piston and stem in the housing;

a pair of axially spaced guides fixed on the distributor body;

a bearing having a race axially rotatable on the housing about the axis but axially nondisplaceable on the housing;

an axially extending rod axially displaceable in the guides on the distributor body and having a front end juxtaposed with the race;

means interconnecting the front end of the rod and the race for permitting limited relative radial movement between the rod front end and the race and for prohibiting relative axial movement between the rod front end and the race;

an actuating element coupled to the rod; and a sensor fixed on the distributor body and actuatable by the element of the rod.

2. The power actuator defined in claim 1 wherein the actuating element is fixed directly on the rod.

3. The power actuator defined in claim 1 wherein the distributor body has a pair of axially spaced flanges forming the guides and formed with axially aligned holes in which the rod is axially slidable.

4. The power actuator defined in claim 1 wherein the means interconnecting the rod front end and the bearing race includes:

a ring fixed on the rod and engageable axially in one direction with the race, another ring axially movable on the rod and engageable axially in the opposite direction with the race, and a spring braced axially between the movable ring and the rod and urging the movable ring axially in the opposite direction into contact with the race.

5. The power actuator defined in claim 4 wherein the rod is formed adjacent the fixed ring with an abutment surface facing in the one direction and axially engageable with the 6. The power actuator defined in claim 4 wherein the means further includes an abutment fixed axially on the rod, the spring being a spring washer braced axially between the abutment and the movable ring.

7. The power actuator defined in claim 1, further comprising means for inhibiting relative angular movement between the rod front end and the race.

8. The power actuator defined in claim 7 wherein the inhibiting means includes radially interengaging formations on the rod front end and the race.

9. The power actuator defined in claim 1 wherein the actuating element is a ring axially displaceable along the rod, the actuator further comprising means for fixing the ring on the rod at any of a multiplicity of axially offset positions therealong.

10. The power actuator defined in claim 1, further comprising a holder carried on the distributor body and carrying the sensor.

11. The power actuator defined in claim 10 wherein the holder is formed with a plurality of axially elongated slots each receiving a respective such sensor, each sensor being provided with means for securing it in position at any of a multiplicity of locations along the respective slot.

12. The power actuator defined in claim 1 wherein the actuator comprises a plurality of such rods distributed angularly around the distributor body and each carrying a respective such actuating element each in turn coacting with at least one such sensor.

13. The power actuator defined in claim 12, further comprising an end plate formed at the axis with a central hole and lying axially rearward of the distributor body, each rod having a rear end fixed in the end plate.

* * * * *